(12) United States Patent
Held, III et al.

(10) Patent No.: US 6,495,084 B1
(45) Date of Patent: Dec. 17, 2002

(54) MOLDING FACILITATOR AND USE THEREOF

(75) Inventors: Theodore D Held, III, Grosse Pointe Farms, MI (US); Douglas J Lasky, Birmingham, MI (US)

(73) Assignee: Henkel Corporation, Gulph Mills, PA (US)

( * ) Notice: Subject to any disclaimer, the term of this patent is extended or adjusted under 35 U.S.C. 154(b) by 0 days.

(21) Appl. No.: 09/554,063

(22) PCT Filed: Nov. 9, 1998

(86) PCT No.: PCT/US98/23229

§ 371 (c)(1),
(2), (4) Date: May 10, 2000

(87) PCT Pub. No.: WO99/24229

PCT Pub. Date: May 20, 1999

Related U.S. Application Data

(60) Provisional application No. 60/064,989, filed on Nov. 10, 1997.

(51) Int. Cl.[7] ................................................. B29C 33/60
(52) U.S. Cl. .................... 264/299; 264/328.1; 264/338; 106/38.24; 106/38.35
(58) Field of Search ................................. 264/109, 122, 264/338, 299, 328.1; 510/394, 421, 445; 249/114.1, 115; 106/38.22, 38.24, 38.35

(56) References Cited

U.S. PATENT DOCUMENTS

| | | | | |
|---|---|---|---|---|
| 4,935,175 A | * | 6/1990 | Kitaura et al. | 106/38.6 |
| 4,936,917 A | * | 6/1990 | Harakal et al. | 106/38.22 |
| 4,976,760 A | * | 12/1990 | Helferich et al. | 55/487 |
| 5,028,366 A | * | 7/1991 | Harakal et al. | 264/338 |
| 5,399,310 A | * | 3/1995 | Payne et al. | 106/38.24 |
| 5,601,774 A | * | 2/1997 | Kohama et al. | 264/331.19 |
| 6,074,588 A | * | 6/2000 | Yamana et al. | 264/130 |

\* cited by examiner

*Primary Examiner*—Jill L. Heitbrink
(74) *Attorney, Agent, or Firm*—Stephen D. Harper

(57) ABSTRACT

Dispersions of waxes in water are now widely used as molding aids, mold release agents, and the like but often leave troublesome residues that can not be easily washed away with water. This problem can be avoided by use instead of a solution in water of certain organic materials, preferably a combination of glycerine and an alkyl imidazoline surfactant.

17 Claims, No Drawings

MOLDING FACILITATOR AND USE THEREOF

This application claims the benefit of Provisional Application Ser. No. 60/064,989 filed Nov. 10, 1997.

BACKGROUND OF THE INVENTION

When a solid macroscopic article of manufacture is made by molding an initially solid sheet or powder, a liquid, or a mixture of liquids or of both liquid and solid raw material(s) into a shape and size defined by a mold cavity, at least part of the surface of the solid macroscopic article of manufacture thus made may adhere to the surface of the mold cavity that shapes its final form so strongly that the molded article can not be removed from the mold cavity without damaging the molded object, the mold cavity surface, or both. To minimize the likelihood of this undesired result, a thin layer of a substance called a "mold release agent" or a similar name, this mold release agent being a substance chemically distinct from both the surface of the mold cavity and from the raw material(s) used to form the molded article, is often coated over the surface of the molding cavity before the raw material(s) to be molded are introduced into the molding cavity.

A first mixture of chemically distinct individual chemical substances is to be understood for purposes of this definition to be chemically distinct from a second mixture of chemically distinct individual chemical substances if any one of the following conditions is true: The second mixture contains at least one chemical substance that is not in the first mixture; the first mixture contains at least one chemical substance that is not in the second mixture; or there is a ratio of the amount of a first chemical substance in the first mixture to the amount of a second chemical substance in the first mixture, the amounts of said first and second chemical substances in said first mixture being expressed in the same units, that is different, by an amount of at least five percent of its own value, from the ratio of the amount of said first chemical substance in the second mixture to the amount of said second chemical substance in the second mixture, said amounts of said first and second chemical substances in said second mixture being expressed in the same units.

In some molding operations, part of the raw materials to be molded may constitute at least one solid body that covers part of the molding surface of the molding cavity and may need to be positioned rather precisely over a particular part of the molding surface, so that other constituents of the raw materials for the molding operation can be kept from contact with the parts of the mold cavity not in contact with this/these solid body or bodies. Any such solid body may be designated hereinafter as a "positioned molding insert". In order to facilitate the precise positioning of any such positioned molding insert, a substance usually called a "molding aid" may be applied to the surface of the positioned molding insert, the mold cavity surface, or both, in order to reduce the energy input that would be required, in the absence of any molding aid, to move the positioned molding insert laterally over the surface of the molding cavity into the precise position where it is desired.

A particular practical instance where such a molding aid is needed is the manufacture of some instrument panels for automobiles. A thin sheet of a vinyl plastic, which will form a "skin" for the final instrument panel, is placed over part of the molding surface for the final molding operation. This plastic sheet is held in place by vacuum applied to small holes in the molding surface and often needs to be repositioned from its first placement on the surface, to have wrinkles in the initial placement smoothed out, or the like. Once the vinyl plastic sheet has been positioned over precisely the desired part of the molding surface for this final molding operation, a reinforcing structure is also put into the molding cavity, which is then closed except for an injection port through which are injected fluid materials that will react to form a solid urethane foam that fills, when the gas filled cells of the foam are considered to be as space filling as the solid parts of the foam, all parts of the molding cavity not already occupied.

This invention relates to compositions that are suitable for use as at least one of molding aids, mold release agents, and any other facilitators of desired motion between a solid molding surface and at least one of (i) a volume of raw material that is to be converted into a solid, molded, macroscopic article of manufacture that has a shape and/or size that is least partially different from that of any individual solid part of the raw material but that conforms to the molding surface and (ii) a solid macroscopic article of manufacture that conforms to the molding surface and has been formed from a volume of raw material that is entirely liquid or contains one or more solid parts, any such solid part being different in shape, size, or both from the last previously aforesaid solid macroscopic article of manufacture. Any such composition may be denoted hereinafter as a "molding facilitator".

Difference or sameness between shapes and/or sizes of two distinct solid objects is to be evaluated by comparison to normal prior art standards of precision of shape and size for the solid macroscopic articles of manufacture produced by the molding operation being performed.

One currently commercially used molding aid for the manufacture of automobile instrument panels as described above is a material known in the art as "banana wax". No details of its chemical composition are known with certainty to the applicants, but it is believed to be an emulsion in water of some waxy solid. When freshly applied, the liquid "banana wax" is effective for its intended use in facilitating the lateral motion of a piece of thin vinyl plastic sheet over a portion of the surface of the molding cavity that includes small holes in which a partial vacuum is maintained during use, to prevent undesired motion of the properly positioned piece of vinyl sheet during the molding process. Also, when freshly applied the liquid "banana wax" can readily be rinsed away by water from any surface when the presence of "banana wax" on the surface is no longer desired. However, the mold surface against which the piece of vinyl plastic sheet is held, with residual "banana wax" between the sheet and the molding surface, is heated during use to 38±6° C., thereby speeding evaporation of water from the liquid "banana wax" composition.

It has often been observed in practice that solid, liquid, or both solid and liquid residues from part of the initially applied liquid "banana wax" remain on at least a portion of the surface of the final molded instrument panel produced in the process and adhere strongly enough that the residues can not be removed even by power washing. Adhesion of subsequently applied paint to any part of the molded article surface that was contaminated with residues before the surface was painted is generally inadequate. Furthermore, liquid and/or solid residues from the initially applied liquid "banana wax" composition may remain on the molding surfaces also and be impossible to remove by rinsing with water only. If left in place on the molding surface, such residues may transfer to the surface(s) of other article(s) later molded by the same molding surface. It is also believed that some of the "banana wax" may migrate into the interior of the molded article produced in a molding process that utilizes it and that any such migration could damage the functioning and/or durability of the molded article.

All of these shortcomings of "banana wax" apply with at least equal detriment to any other commercial preparation for the same purpose that has been tested.

Accordingly, the major object of this invention is to provide a composition for use as a molding facilitator that will remain readily rinseable with water even after completely drying and will otherwise function at least as satisfactorily as the prior art material known as "banana wax". Other alternative and/or concurrent objects are to minimize migration of any constituent of the molding facilitator into the interior of any object molded in contact with the molding facilitator, to provide corrosion protection to mold surfaces covered with the molding facilitator, and to provide a molding facilitator that will lower overall costs of molding processes using it, compared with molding processes using prior art molding facilitators. Other objects will become apparent from the description below.

Except in the claims and the operating examples, or where otherwise expressly indicated, all numerical quantities in this description indicating amounts of material or conditions of reaction and/or use are to be understood as modified by the word "about" in describing the broadest scope of the invention. Practice within the numerical limits stated is generally preferred, however. Also, throughout the description, unless expressly stated to the contrary: percent, "parts of", and ratio values are by weight or mass; the term "polymer" includes "oligomer", "copolymer", "terpolymer" and the like, the description of a group or class of materials as suitable or preferred for a given purpose in connection with the invention implies that mixtures of any two or more of the members of the group or class are equally suitable or preferred; description of constituents in chemical terms refers to the constituents at the time of addition to any combination specified in the description or of generation in situ within the composition by chemical reaction(s) noted in the specification between one or more newly added constituents and one or more constituents already present in the composition when the other constituents are added, and does not necessarily preclude unspecified chemical interactions among the constituents of a mixture once mixed; specification of constituents in ionic form additionally implies the presence of sufficient counterions to produce electrical neutrality for the composition as a whole and for any substance added to the composition; any counterions thus implicitly specified preferably are selected from among other constituents explicitly specified in ionic form, to the extent possible; otherwise such counterions may be freely selected, except for avoiding counterions that act adversely to an object of the invention; the word "mole" means "gram mole", and the word itself and all of its grammatical variations may by used for any chemical species defined by all of the types and numbers of atoms present in it, irrespective of whether the species is ionic, neutral, unstable, hypothetical, or in fact a stable neutral substance with well defined molecules; and the terms "solution", "soluble", "homogeneous", and the like are to be understood as including not only true equilibrium solutions or homogeneity but also dispersions that show no visually detectable tendency toward phase separation over a period of observation of at least 100, or preferably at least 1000, hours during which the material is mechanically undisturbed and the temperature of the material is maintained within the range of 18–25° C.

BRIEF SUMMARY OF THE INVENTION

It has been found that at least the major object of the invention as stated above can be achieved by use as a molding facilitator of a liquid composition that comprises, preferably consists essentially of, or more preferably consists of:

(A) a concentration of a dissolved component selected from a group consisting of organic substances each molecule of which contains at least one continuously chemically bonded chain or ring of atoms in which there are at least two, or preferably at least three, carbon atoms and at least two atoms selected from a group of heteroatoms, said group of heteroatoms consisting of oxygen, nitrogen, sulfur, and phosphorus, preferably oxygen and nitrogen, said carbon atoms and heteroatoms being arranged in such an order along said continuously chemically bonded chain or ring that (i) each heteroatom is bonded to at least one carbon atom and (ii) the chain does not include more than three consecutive continuously chemically bonded carbon atoms; this condition does not exclude bonding of either a carbon atom or a heteroatom that is within said continuously chemically bonded chain or ring to other carbon atoms not part of said continuously chemically bonded chain or ring, and the bonding required within said chain or ring may include double or triple as well as single bonds; and, optionally, one or more of the following components:

(B) a concentration of a component of one or more surfactants that consists of molecules that are not part of component (A);

(C) water;

(D) a component of pH adjusting agent that is not part of any of components (A), (B), and (C);

(E) a component of preservative material that is not part of any of components (A), (B), (C), and (D);

(F) a component of viscosity adjusting agent that is not part of any of components (A), (B), (C), (D), and (E); and (G) a component of humectant material that is not part of any of components (A), (B), (C), (D), (E), and (F).

DETAILED DESCRIPTION OF THE INVENTION

Component (A) as described above is normally the predominant constituent, with the frequent exception of water, in a liquid composition used according to the invention as a molding facilitator. The combination of hydrophilic and hydrophobic portions in molecules constituting component (A) is believed to make them particularly suitable for spreading over molding surfaces and being easily rinsed away with water after use. Additionally, molecules of this type with sufficiently high molecular weights to give them low volatility, even at the temperatures of moderately heated molding surfaces, are readily available commercially.

Because of their low cost and ready availability, particularly preferred groups of materials for component (A) are (i) those materials, denoted herein as "glycols" and "glycol polymers" even though they include more materials than are sometimes included in these terms by others, the molecules of which conform to the chemical formula HO—$(C_nH_{2n}O_m)_p$—H, where n is an integer from 2 to 6, preferably from 2 to 4, more preferably 2 or 3, or most preferably 2; m, for each molecule, is an integer with a value not greater than the value of n for the same molecule, preferably not greater than 2 and more preferably, unless p=1, exactly 1; and p, for each molecule, is an integer with a value of 1 for glycols and a value of at least 2 for glycol polymers; and (ii) the mono- and di-ethers of such glycols and glycol polymers, said ethers having terminal alkyl moieties with from 1 to 6, preferably from 1 to 4, or more preferably from 1 to 3, carbon atoms. If p is two or more, the values of n and m may be the same or different from one to another of the p instances of the moiety —$C_nH_{2n}O_m$—in each molecule, and if n is greater than 2, all except two of the carbon atoms in each —$C_nH_{2n}O_m$—moiety may be out of the continuously chemically bonded chain that is necessarily present in a moiety —$C_nH_{2n}O_m$—$C_nH_{2n'}O_m$—which is present in each molecule of a glycol polymer. (If n is always four or greater, some of the carbon atoms present in each —$C_nH_{2n}O_m$— moiety must be out of the continuously chemically bonded chain in at least one —$C_nH_{2n}O_m$—$C_nH_{2n'}O_m$—moiety in each molecule, in order for the molecule to satisfy the conditions for belonging to component (A). For glycol polymers, any one or more of n, m, and p may have an average non-integral value for component (A) as a whole.) Polymers of ethylene and/or propylene glycol(s) in which there are at least two glycol units are, along with glycerin and propylene glycol itself, particularly preferred constituents for component (A).

In order to achieve an optimum balance between lubricity and water rinseability of a molding facilitator used according to this invention, the weight average molecular weight of any glycol polymers portion of component (A) in the film, which glycol polymers portion may or may not constitute all of component (A), preferably is at least, with increasing preference in the order given, 100, 150, 200, 250, 300, 325, 350, 375, or 395 and independently preferably is not more than, with increasing preference in the order given, 4000, 3000, 2000, 1750, 1500, 1250, 1000, 750, or 500.

Another type of generally highly satisfactory and commercially available materials for component (A) as described above are ethers, particularly monoethers, of glycol polymers. Non-limiting examples of these materials include diethylene glycol monobutyl ether, tripropylene glycol monomethyl ether, and dipropylene glycol mono-n-propyl ether. For these materials, a somewhat lower average molecular weight than for the glycol polymers themselves is preferred. Specifically, the weight average molecular weight of any ethers of glycol polymers present in component (A) of a composition to be used according to the invention as a molding facilitator preferably is at least, with increasing preference in the order given, 80, 100, 120, 140, 150, 160, 170, 180, or 185 and independently preferably is not greater than, with increasing preference in the order given, 500, 400, 350, 300, 280, 260, 250, 240, 230, or 225.

Among the monomeric glycols as defined above that may be constituents of component (A) according to the invention, glycerin is most preferred, propylene glycol is nearly as preferred as glycerin, and ethylene glycol is distinctly less preferred, although suitable.

A normally preferred at least partial constituent of component (A) as described above is material with stronger surfactant properties than most of the glycols, glycol polymers and their ethers. One especially preferred type of such materials is constituted of molecules that, in addition to having in each molecule at least one continuously chemically bonded chain or ring of atoms in which there are at least two carbon atoms and at least two heteroatoms, as required to be part of component (A), also have at least one hydrophobe moiety that satisfies all of the following conditions: (i) it has not more than two open valences; (ii) it has a number of carbon atoms that is at least, with increasing preference in the order given, 8, 10, 12, 14, or 16; (iii) it contains no atoms other than carbon, hydrogen, nitrogen, oxygen, phosphorus, sulfur, and halogens and preferably, primarily for reasons of economy, contains no halogen atoms or more preferably no halogen, phosphorus, or sulfur atoms; (iv) if it contains any atoms of nitrogen, oxygen, phosphorus, or sulfur, it contains such atoms in a number having a ratio to the number of carbon atoms in the same moiety that is not more than, with increasing preference in the order given, 0.34:1.0, 0.30:1.0, 0.25:1.0, 0.20:1.0, 0.15:1.0, 0.10:1.0, or 0.05:1.0. (It should be noted that block copolymers of propylene oxide and ethylene oxide, if the blocks of polypropylene oxide are long enough, can satisfy this definition if they have surfactant properties, i.e., if they cause a reduction in the surface tension of water when dissolved therein.)

A particular type of surfactant constituent of component (A) that is preferred in certain instances is one in which each molecule includes a substituted imidazoline moiety (which itself satisfies the structural formula conditions for being part of component (A)) in which there is a hydrophobic moiety attached to the carbon atom in the imidazoline moiety that is directly bonded to both nitrogen atoms in the imidazoline moiety, and preferably there is also at least one, or more preferably two, substituent moieties bonded to nitrogen atom(s) in the imidazoline moiety, these substituent moieties being selected from the group consisting of (i) hydroxyalkyl moieties, preferably hydroxymethyl and hydroxyethyl moieties, more preferably the latter; (ii) carboxyalkyl moieties (i.e., moieties derived from carboxylic acids by removing from each molecule thereof one hydrogen atom that is not the one that is part of the characteristic —COOH moiety of the carboxylic acid), preferably those derived from propanoic or 2-methyl propanoic acid, more preferably the former; and (iii) carbonate moieties. 2-Alkylimidazoline-moiety-containing surfactants of this type favor good wetting of most surfaces. However, these surfactants are considerably more expensive than most other suitable surfactants that can constitute part of component (A) as defined above, and therefore, at least for reasons of economy, preferably are used, if at all, only when and to the extent that their advantages are needed. The carboxyalkyl moiety may be free acid or a salt, preferably a salt with an alkali metal cation. One particularly preferred example of this type of surfactant is one available commercially from Mona Industries under the name "MONATERIC™ Cy Na 50" and reported by its supplier to be a 50% solution in water of the sodium salt of 3-[1-(2-hydroxyethyl)-2-capryl-3-imidazolinyl] propanoic acid. Another particularly preferred embodiment of this type of surfactant is one available commercially from Lonza, Inc. under the name "AMPHOTERGE™ KJ-2" and reported by its supplier to be a 40% solution in water of substituted imidazoline dicarbonate molecules.

Component (A) in total preferably constitutes at least, with increasing preference in the order given, 0.10, 0.30, 0.70, 1.00, 1.5, 2.0, 2.5, 3.0, 3.5, 4.0, 4.5, 5.0, 7.0, 8.0, 9.0, 10.0, or 11.0% of a total composition to be used as a molding facilitator in a process according to the invention. Independently, surfactants belonging to component (A) preferably constitute at least, with increasing preference in the order given, 0.0010, 0.0030, 0.0070, 0.015, 0.030, 0.060, 0.080, 0.10, 0.15, 0.30, 0.50, 0.70, 0.80, 0.90, 1.0, or 1.1% of a total composition to be used as a molding facilitator in a process according to the invention, and, if the surfactant portion of component (A) does not include alkyl imidazoline moiety containing surfactants in an amount of at least 0.10% of the total composition, more preferably constitutes at least, with increasing preference in the order given, 1.3, 1.5, 1.7, or 2.0% of the total composition. Also and independently, molecules selected from a group consisting of (i) homopolymers of ethylene glycol, (ii) monoethers of polymers of ethylene and propylene glycols, and (iii) glycerin and propylene glycol preferably constitute at least, with increasing preference in the order given, 0.10, 0.30, 0.70, 1.0, 1.5, 2.0, 2.5, 3.0, 3.5, 4.0, 4.5, or 5.0% of a total composition to be used as a molding facilitator in a process according to the invention. Independently of one another and of any other stated preferences: molecules selected from the group consisting of (i) homopolymers of ethylene glycol and (ii) monoethers of polymers of ethylene and propylene glycols preferably constitute not more than, with increasing preference in the order given, 50, 40, 35, 30, or 25% of the total composition; surfactants belonging to component (A) preferably constitute not more than, with increasing preference in the order given, 40, 30, 20, 15, 12, 10, 8, or 6% of the total composition; and component (A) in total constitutes not more than, with increasing preference in the order given, 90, 80, 70, 60, 50, 40, or 31% of the total composition, all of the preferences stated in this sentence being primarily for reasons of economy.

When both glycol molecules and imidazoline-moiety-containing surfactant molecules are included as part of component (A) as preferred, the ratio of the mass of glycol molecules to the mass of imidazoline-moiety-containing surfactant molecules, both masses being expressed in the same unit, in any volume of a composition to be used as a mold facilitator according to this invention preferably is at least, with increasing preference in the order given, 1.0:1.0, 2.0:1.0, 3.0:1.0, 4.0:1.0, 5.0:1.0, 6.0:1.0, 7.0:1.0, 7.5:1.0, 8.0:1.0, 8.5:1.0, or 9.0:1.0 and independently preferably is not more than, with increasing preference in the order given, 50:1.0, 40:1.0, 30:1.0, 20:1.0, 18:1.0, 16:1.0, 14:1.0, 12:1.0, 11.0:1.0, 10.5:1.0, 10.0:1.0, or 9.5:1.0.

Ordinarily it is preferable if all of the surfactant in a composition to be used as a molding facilitator in a process according to the invention is part of component (A). In this instance, component (B) as described above is not needed and therefore preferably is not used. However, an antifoam agent that does not satisfy the conditions for belonging to component (A) may be needed in certain instances, as may other conventional surfactants, in order to achieve adequate and rapid wetting of the molding surface to be used. Highly fluorinated surfactants, for example, may be needed for plastics that have very low surface energies and are therefore difficult for most water-based compositions to wet.

Care should be taken to avoid utilizing any surfactants that, in the concentrations of them used, are likely to penetrate into the interior of the substance(s) being molded and thereby physically weaken the molded object produced and/or weaken the adhesion of subsequently desired finishes to the surface of the molded object produced.

Ordinarily water is a preferred component of a composition to be used as a molding facilitator in a process according to the invention, if for no other reason than reducing the cost of the composition. Thus, normally water preferably constitutes the balance of any amount of a composition to be used as a molding facilitator in a process according to the invention that is not specified to be some other substance.

A composition to be used as a molding facilitator in a process according to the invention preferably has a pH value in a very mildly acidic to mildly alkaline range. More particularly, the pH preferably is at least, with increasing preference in the order given, 5.5, 6.0, 6.3, 6.6, 6.9, 7.1, 7.3, 7.6, 7.9, or 8.2 and, if the composition does not contain any glycol polymers or glycol polymer ethers, more preferably is at least, with increasing preference in the order given, 8.5, 8.8, 9.1, or 9.4; independently the pH preferably is not more than, with increasing preference in the order given, 11.0, 10.5, 10.2, 9.9, or 9.6. In order to achieve a preferred pH, an alkalinizing pH adjusting component (D), in addition to any materials in components (A) through (C) as defined above, may be needed. Aqueous ammonia or an amine is generally preferred for this purpose. If the pH is not too alkaline, ammonia may normally be used without danger of a serious odor nuisance, but if more alkaline pH values are desired, a relatively non-volatile amine, preferably an amine with at least two and preferably three substituent moieties selected from the group consisting of hydroxymethyl, hydroxyethyl, and hydroxypropyl moieties, most preferably hydroxyethyl, are preferably used instead to avoid a malodorous composition. If an acidizing pH adjusting agent should be needed, numerous ones are known to those skilled in the art.

Normally, the presence of a preservative, component (E) as described above, in a composition to be used as a molding facilitator in a process according to the invention is highly preferred if the composition is to be stored in an open container during use as it usually is, because some commonly air-borne microorganisms with malodorous and/or otherwise disagreeable metabolic products are readily attracted to and nourished by most of the constituents normally used for component (A). Any preservative with sufficient protective value against ambient microorganisms may be used, provided that it does not adversely affect the molding facilitator properties of the composition. Preservatives containing isothiazolin-3-one moieties, more particularly a mixture of the commercial products KATHON™ 886 MW and 893 MW preservatives from Rohm and Haas Co., have been found particularly satisfactory. KATHON™ 886 MW is reported by its supplier to contain 10–12% of 5-chloro-2-methyl-isothiazolin-3-one and 3–5% of 2-methyl-isothiazolin-3-one as its preservative active ingredients along with 14–18% of magnesium nitrate and 8–10% of magnesium chloride, all in water solution with water as the balance, and to be particularly effective against bacteria. KATHON™ 893 MW is reported by its supplier to contain 45–48% of 2-n-octyl-4-isothiazolin-3-one and 52–55% of propylene glycol. Accordingly, a composition to be used as a molding facilitator in a process according to the invention preferably contains, independently for each material noted, at least, with increasing preference in the order given: 0.50, 0.75, 0.90, 1.00, 1.10, 1.20, 1.30, or 1.37 parts per million by weight of the total composition, hereinafter usually abbreviated as "ppm", of 5-chloro-2-methyl-isothiazolin-3-one; 0.10, 0.20, 0.25, 0.30, 0.35, 0.40, 0.45, or 0.48 ppm of 2-methyl-isothiazolin-3-one; and 0.75, 1.00, 1.50, 2.00, 2.25, 2.45, 2.60, 2.75, or 2.90 ppm of 2-n-octyl-isothiazolin-3-one. Also, independently of other preferences and independently for each material noted, a composition to be used as a molding facilitator in a process according to the invention preferably contains not more than, with increasing preference in the order given: 10, 8, 6, 4.0, 3.0, 2.5, 2.0 or 1.5 ppm of 5-chloro-2-methyl-isothiazolin-3-one; 5, 3, 2.0, 1.5, 1.0, 0.8, 0.6, or 0.54 ppm of 2-methyl-isothiazolin-3-one; and 25, 15, 10, 8, 6, 5.0, 4.0, 3.7, 3.4, 3.2, or 3.0 ppm of 2-n-octyl-isothiazolin-3-one, all of the preferences stated in this sentence being primarily for reasons of economy.

The rheological properties of a composition to be used as a molding facilitator in a process according to the invention should be such as are needed to keep a coating formed with the composition in place during its use in molding. Often, a satisfactory rheology can be achieved by proper selection of the materials constituting component (A) as described above, and when this is possible, it is normally preferred. If needed, however, any other rheology modifying agent may be added to such a composition to be used as a molding facilitator in a process according to the invention without departing from the spirit of the invention, provided that the rheology modifying agent used does not adversely affect the molding facilitator properties of the film formed. Acrylic acid polymers, natural gums, synthetic carbohydrate polymers, and other water soluble materials of this kind are normally preferred when needed.

Humectant component (G) is not normally needed or advantageous in a composition to be used as a molding facilitator in a process according to the invention, particularly if monomeric glycols as described above, most of which have humectant properties, are included as part of component (A).

For a variety of reasons, almost always including at least the economic reason of avoiding an unnecessary component, it is preferred that compositions to be used as a molding facilitator in a process according to the invention should be substantially free from many ingredients, including some used in the prior art in molding facilitator compositions. Specifically, it is increasingly preferred in the order given, independently for each preferably minimized component listed below, that compositions to be used as a molding facilitator in a process according to the invention preferably contain, with increasing preference in the order given, no more than 1.0, 0.35, 0.10, 0.08, 0.04, 0.02, 0.01, 0.001, or 0.0002,% of each of the following constituents, except for and to the extent that these constituents may be part of optional components explicitly described hereinabove: esters of glycols and glycol polymers with carboxylic acids, particularly with carboxylic acids having 7 or more carbon atoms per molecule; ethers of glycols and glycol polymers with alkyl moieties having 7 or more carbon atoms per moiety; silicones and silicates, i.e., any chemical substances containing O—Si—O moieties; molecules that include both a poly{oxyalkylene} moiety and an aryl moiety in each molecule; hexavalent chromium, cyanide, nitrite ions, coordinate complexing agents for divalent or higher valent metal cations; dispersed or emulsified chemical substances that are not soluble in water to an extent of at least, with increasing preference in the order given, 1.0, 2.0, 3.0, 4.0, 5.0, 6.0, 7.0, 8.0, or 9.0%; soluble metal salts of fatty carboxylic acids with from 10 to 22 carbon atoms per molecule; inorganic compounds of any of the halogen elements; and any compounds containing any one of the elements boron, beryllium, and all elements, except for alkali metals and halogens, that have an atomic number greater than or equal to 19.

Substances that can be effectively molded in a process according to this invention include, but are not limited to, polyester sheet molding compound (hereinafter usually abbreviated as "SMC"), both primed and unprimed, the latter also often being called "raw"; poly{vinyl chloride} (hereinafter usually abbreviated as "PVC") homopolymers and copolymers; polyurethane and polyurea plastics such as those of objects made commercially by injection molding from these plastics; terpolymers of acrylonitrile, butadiene, and styrene (hereinafter usually abbreviated as "ABS"); poly{phenylene oxide} (hereinafter usually abbreviated as "PPO") and copolymers of "phenylene oxide" with other materials such as polyamides; polycarbonate ("PCO") polymers and copolymers; and thermoplastic polyolefins (hereinafter usually abbreviated as "TPO").

Practice of this invention may be further appreciated from consideration of the working and comparison examples described below.

Comparison Example A

One use of "banana wax" as a molding aid has already been described above.

General Group 1—With Compositions Generally Including Glycol Polymers and/or Glycol Polymer Ethers Compositions for this group are given in Table 1 below.

TABLE 1

LIQUID COMPOSITIONS FOR POSSIBLE USE AS MOLDING FACILITATORS

| Ingredient and Concentration Unit | Concentration of Ingredient in Composition Number: | | | | | | | |
|---|---|---|---|---|---|---|---|---|
| | 1.1 | 1.2 | 1.3 | 1.4 | 1.5 | 1.6 | 1.7 | 1.8 |
| Polyethylene glycol, 1000 MoWg, % | 5.7 | 12 | 9.7 | | 25 | | | 10 |
| Polyethylene glycol, 400 MoWg, % | 1.1 | 12 | 9.7 | | 25 | 17 | | 10 |
| 96% Glycerin, % | 15 | | | | | | | |
| Dipropylene glycol, mono-n-propyl ether, % | | | | | | | 10 | |
| MONATERIC ™ Cy Na 50 surfactant sol., % | | 3.1 | | | | 2.5 | | 2.0 |
| PLURONIC ™ L-64 surfactant, % | 3.5 | 2.6 | 4.0 | 7.0 | 4.0 | | | 1.7 |
| ANTAROX ™ LF-344 surfactant, % | 0.5 | 0.4 | | | | | | 0.3 |
| ANTAROX ™ LF-224 surfactant, % | | | 1.7 | 1.7 | 1.7 | | | |
| TRITON ™ N-57 surfactant, % | | | 0.3 | 0.3 | 0.3 | | | |
| PLURAFAC ™ RA-40 surfactant, % | | | | | | | 30 | |
| PLURAFAC ™ RA-30 surfactant, % | | | | | | 2.2 | | |
| PLURAFAC ™ RA-20 surfactant, % | | | | | | 0.9 | | |
| TRITON ™ DF-12 surfactant, % | | | | | | 0.4 | | |
| Dee Fo ™ 97-3 antifoam agent, % | | | | | | | | 0.04 |
| FLUOWET ™ PL80 surfactant, % | | | | | | 0.09 | | |
| 28% Ammonia in water, ppt | 0.5 | 0.5 | 0.5 | 0.5 | 0.5 | | | 0.5 |
| Triethanol amine, % | | | | | | 0.7 | 1.1 | |
| KATHON ™ 886 MW, ppm | 13 | 13 | 13 | 13 | 13 | 13 | 13 | 13 |

TABLE 1-continued

LIQUID COMPOSITIONS FOR POSSIBLE USE AS MOLDING FACILITATORS

| Ingredient and Concentration Unit | Concentration of Ingredient in Composition Number: | | | | | | | |
|---|---|---|---|---|---|---|---|---|
| | 1.1 | 1.2 | 1.3 | 1.4 | 1.5 | 1.6 | 1.7 | 1.8 |
| KATHON ™ 893 MW, ppm | 6.4 | 6.4 | 6.4 | 6.4 | 6.4 | 6.4 | 6.4 | 6.4 |
| ACUSOL ™ 810 thickening agent | | | | | | 0.6 | | |

Abbreviations and Other Notes for Table 1
"MoWg" means "weight average molecular weight"; "sol." means "solution in water".
Water constituted the unspecified balance of the compositions shown in this table.
PLURONIC ™ L-64 and PLURAFAC ™ RA-40, -30, and -20 surfactants were obtained commercially from BASF Corp. and were reported by their supplier to be block copolymers of propylene and ethylene oxide for the first listed and modified oxyethylated straight chain alcohols for the remainder.
ANTAROX ™ LF-344 and LF 224 were obtained commercially from Rhône-Poulenc and were reported by their supplier to be modified linear aliphatic polyether and alkoxylated alcohol respectively. TRITON ™ N-57 and DF-12 surfactants were obtained commercially from Union Carbide and are reported by their supplier to be nonylphenoxypolyethoxyethanol and modified polyethoxylated straight chain alcohol respectively. FLUOWET ™ PL80 surfactant was obtained commercially from Minnesota Mining and Manufacturing Co. and was reported by its supplier to be perfluorinated alkyl phosphonic and phosphinic acids. ACUSOL ™ 810 thickening agent was obtained commercially from Rohm & Haas and was reported by its supplier to be a 15–19% solution in water of polyacrylic acid. Dee FO ™ 97-3 was obtained commercially from Ultra Additives, Inc., Paterson, New Jersey (no chemical information about it was given, except that it contained 4% petroleum solvent.).

General Group 2—With Compositions Including Monomeric Glycols as Predominant Constituents of Componenet (A)

Compositions for this group are shown in Table 2 below.

TABLE 2

MORE LIQUID COMPOSITIONS FOR POSSIBLE USE IN DETECTING DEFECTS IN PLASTIC SURFACES

| Ingredient | Parts by Weight of Ingredient in Composition Number: | | | | | | | |
|---|---|---|---|---|---|---|---|---|
| | 2.1 | 2.2 | 2.3 | 2.4 | 2.5 | 2.6 | 2.7 | 2.8 |
| Deionized Water | 120 | 120 | 138 | 126 | 135 | 135 | 135 | 156 |
| AMPHOTERGE ™ KJ-2 surfactant | 7.5 | 7.5 | 1.5 | 1.5 | 4.5 | 4.5 | 4.5 | 4.5 |
| 96% Glycerin | 21.5 | 21.5 | 21.5 | | 21.5 | 21.5 | 21.5 | |
| Ethylene glycol | | | | 21.5 | | | | |
| FLUOWET ™ PL80 surfactant, % | 0.10 | 0.01 | 0.03 | 0.03 | 0.03 | 0.03 | | 0.03 |
| ACUSOL ™ 810 thickening agent | 0.9 | 0.9 | 0.9 | 0.9 | 0.45 | | | |
| Other Characteristics of Composition: | | | | | | | | |
| Concentration of KATHON ™ 886 MW, ppm: | 13 | 13 | 13 | 13 | 13 | 13 | 13 | 13 |
| Concentration of KATHON ™ 893 MW, ppm: | 6.4 | 6.4 | 6.4 | 6.4 | 6.4 | 6.4 | 6.4 | 6.4 |
| pH of the Composition: | 9.4 | 9.4 | 7.9 | n.m. | 9.4 | n.m. | n.m. | n.m. |

Abbreviations and Other Notes for Table 2
"n.m." means "not measured".
A blank space in a cell of the upper part of the table indicates that none of the material named in the row containing the cell was added to the composition.

Compositions of both Groups 1 and 2 are effective molding facilitators. For example, any residues from Composition 2.5, unlike residues from "banana wax", after 30 minutes at 49° C. when spread over a stainless steel plate, such as could be used for a molding surface, easily rinse away with water. Furthermore, even when Composition 2.5 is deliberately coated on a vinyl skin of the type used in the commercial operation described above that is now performed with "banana wax" as a molding aid and is exposed to 49° C. for 2 hours in an oven, the residues are easily removed from the vinyl skin after this exposure time with hot water rinsing aided by very low pressure scrubbing. A sample of the vinyl skin material similarly treated with "banana wax" developed a waxy residue that could not be removed even by vigorous scrubbing, with or without the aid of a conventional dishwashing detergent.

What is claimed is:

1. A process for manufacturing a solid macroscopic article, said process comprising steps of:
 (I) providing (i) a volume of raw material that is to be converted into said solid macroscopic article of manufacture, said volume of raw material not including any single solid portion that has the same shape and size as said solid macroscopic article of manufacture, said raw material being selected from the group consisting of: primed and unprimed polyester sheet molding compound; poly{vinyl chloride}; polyurethane and polyurea plastics; terpolymers of acrylonitrile, butadiene, and styrene; poly{phenylene oxide}; polycarbonate polymers; and thermoplastic polyolefins, (ii) a solid molding surface having the same size and shape as the outer surface of said solid macroscopic article to be manufactured in the process, and (iii) a liquid molding facilitator that is chemically distinct from both said raw material and said molding surface;

(II) bringing an outer surface of said volume of raw material into contact with said molding surface, or into contact with a volume of the liquid molding facilitator that has the same shape and size as said solid molding surface and is in contact therewith, for a sufficient time under conditions of temperature and pressure that convert said volume of raw material into said solid macroscopic article of manufacture; and (III) separating said solid macroscopic article of manufacture from contact with said molding surface or with said volume of the liquid molding facilitator that has the same shape and size as said solid molding surface and is in contact therewith, at least one part of said process consisting of relative motion between (i) a solid part of said raw material, said solid macroscopic article manufactured in the process, or both and (ii) a part of said molding surface, at a time when direct contact between these immediately previously recited items (i) and (ii) is prevented during said relative motion by an interposing volume of at least one of:

said liquid molding facilitator; and a liquid or solid residue formed by reduction in volume of at least a portion of said molding facilitator by evaporation of at least one relatively volatile constituent thereof, any said residue being chemically distinct from both said raw material and said molding surface, wherein the improvement comprises use as said molding facilitator of a liquid composition that comprises:

(A) a concentration of a dissolved component consisting of organic substances each molecule of which contains at least one continuously chemically bonded chain or ring of atoms in which there are at least two carbon atoms and at least two atoms selected from a group of heteroatoms, said group of heteroatoms consisting of oxygen, nitrogen, sulfur, and phosphorus, said carbon atoms and heteroatoms being arranged in such an order along said continuously chemically bonded chain or ring that (i) each heteroatom is bonded to at least one carbon atom and (ii) the chain or ring does not include more than three consecutive continuously chemically bonded carbon atoms, wherein the average molecular weight of such organic substances comprising glycol polymers does not exceed 4000.

2. A process according to claim 1, wherein, in said liquid molding facilitator:

component (A) constitutes at least 0.70% of the total molding facilitator liquid composition;

surfactant molecules that are part of component (A) constitute at least 0.080% of the total molding facilitator liquid composition; and molecules selected from a group consisting of (i) homopolymers of ethylene glycol, (ii) monoethers of polymers of ethylene and propylene glycols, and (iii) glycerin and propylene glycol constitute at least 0.10% of the total molding facilitator liquid composition.

3. A process according to claim 2, wherein, in said liquid molding facilitator, there are present distinct masses of each of (i) imidazoline-moiety-containing surfactant molecules, each of which includes a substituted imidazoline moiety in which there is a hydrophobic moiety attached to the carbon atom in the imidazoline moiety that is directly bonded to both nitrogen atoms in the imidazoline moiety and (ii) glycol molecules, and the mass of glycol molecules has a ratio to the mass of imidazoline-moiety-containing surfactant molecules that is from 3.0:1.0 to 20:1.0.

4. A process according to claim 3, wherein:

said imidazoline-moiety-containing surfactant molecules also include at least one substituent moiety bonded to a nitrogen atom in the imidazoline moiety, these substituent moieties being selected from the group consisting of (i) hydroxyalkyl moieties, (ii) carboxyalkyl moieties, and (iii) carbonate moieties;

the ratio of the mass of glycol molecules to the mass of imidazoline-moiety-containing surfactant molecules is from 5.0:1.0 to 16:1.0;

component (A) constitutes from 4.0 to 40% of the total molding facilitator liquid composition;

surfactant molecules that are part of component (A) constitute from 0.30 to 15% of the total molding facilitator liquid composition;

molecules selected from a group consisting of (i) homopolymers of ethylene glycol, (ii) monoethers of polymers of ethylene and propylene glycols, and (iii) glycerin and propylene glycol constitute at least 2.5% of the total molding facilitator liquid composition;

molecules selected from a group consisting of (i) homopolymers of ethylene glycol and (ii) monoethers of polymers of ethylene and propylene glycols do not constitute more than 30% of the total composition; and the molding facilitator liquid composition has a pH value within a range from 6.0 to 11.0.

5. A process according to claim 4, wherein:

said imidazoline-moiety-containing surfactant molecules are selected from a group consisting of (i) alkali metal salts of 3-[1-(2-hydroxyethyl)-2-capryl-3-imidazolinyl] propanoic acid and (ii) substituted imidazoline dicarbonate molecules;

the ratio of the mass of glycol molecules to the mass of imidazoline-moiety-containing surfactant molecules is from 7.5:1.0 to 11.0:1.0;

component (A) constitutes from 8.0 to 31% of the total molding facilitator liquid composition;

surfactant molecules that are part of component (A) constitute from 0.80 to 6% of the total molding facilitator liquid composition;

molecules selected from a group consisting of (i) homopolymers of ethylene glycol, (ii) monoethers of polymers of ethylene and propylene glycols, and (iii) glycerin and propylene glycol constitute at least 5.0% of the total molding facilitator liquid composition;

molecules selected from a group consisting of (i) homopolymers of ethylene glycol and (ii) monoethers of polymers of ethylene and propylene glycols do not constitute more than 10% of the total composition; and the molding facilitator liquid composition has a pH value within a range from 7.6 to 9.9.

6. A process according to claim 1, wherein said liquid molding facilitator has been made by mixing with a first mass of water a second mass of component (A) that constitutes at least 0.70% of the total molding facilitator liquid composition, said second mass more particularly comprising:

a third mass of surfactant molecules that are part of component (A) and that constitute at least 0.080% of the total molding facilitator liquid composition; and a fourth mass of molecules selected from a group consisting of (i) homopolymers of ethylene glycol, (ii) monoethers of polymers of ethylene and propylene glycols, and (iii) glycerin and propylene glycol that constitute at least 0.10% of the total molding facilitator liquid composition.

7. A process according to claim 6, wherein said third mass includes a fifth mass of imidazoline-moiety-containing surfactant molecules, each of which includes a substituted imidazoline moiety in which there is a hydrophobic moiety attached to the carbon atom in the imidazoline moiety that is directly bonded to both nitrogen atoms in the imidazoline moiety; said third mass includes a sixth mass of glycol molecules; and said sixth mass has a ratio to said fifth mass that is from 3.0:1.0 to 20:1.0.

8. A process according to claim 7, wherein:
   said imidazoline-moiety-containing surfactant molecules also include at least one substituent moiety bonded to a nitrogen atom in the imidazoline moiety, these substituent moieties being selected from the group consisting of (i) hydroxyalkyl moieties, (ii) carboxyalkyl moieties, and (iii) carbonate moieties;
   the ratio of said sixth mass to said fifth mass is from 5.0:1.0 to 16:1.0;
   said second mass constitutes from 4.0 to 40% of the total molding facilitator liquid composition;
   said third mass constitutes from 0.30 to 15% of the total molding facilitator liquid composition;
   said fourth mass constitutes at least 2.5% of the total molding facilitator liquid composition;
   molecules selected from a group consisting of (i) homopolymers of ethylene glycol and (ii) monoethers of polymers of ethylene and propylene glycols do not constitute more than 30% of the total composition; and
   the molding facilitator liquid composition has a pH value within a range from 6.0 to 11.0.

9. A process according to claim 8, wherein:
   said imidazoline-moiety-containing surfactant molecules are selected from a group consisting of (i) alkali metal salts of 3-[1-(2-hydroxyethyl)-2-capryl-3-imidazolinyl] propanoic acid and (ii) substituted imidazoline dicarbonate molecules;
   the ratio of said sixth mass to said fifth mass is from 7.5:1.0 to 11.0:1.0;
   said second mass constitutes from 8.0 to 31% of the total molding facilitator liquid composition;
   said third mass constitutes from 0.80 to 6% of the total molding facilitator liquid composition;
   molecules selected from a group consisting of (i) homopolymers of ethylene glycol, (ii) monoethers of polymers of ethylene and propylene glycols, and (iii) glycerin and propylene glycol constitute at least 5.0% of the total molding facilitator liquid composition;
   molecules selected from a group consisting of (i) homopolymers of ethylene glycol and (ii) monoethers of polymers of ethylene and propylene glycols do not constitute more than 10% of the total molding facilitator liquid composition; and
   the molding facilitator liquid composition has a pH value within a range from 7.6 to 9.9.

10. A liquid composition of matter useful as a molding facilitator in a process according to claim 2, said liquid composition comprising, to an extent of at least 0.70% of the total composition, a dissolved component (A) consisting of organic substances each molecule of which contains at least one continuously chemically bonded chain or ring of atoms in which there are at least two carbon atoms and at least two atoms selected from a group of heteroatoms, said group of heteroatoms consisting of oxygen, nitrogen, sulfur, and phosphorus, said carbon atoms and heteroatoms being arranged in such an order along said continuously chemically bonded chain or ring that (i) each heteroatom is bonded to at least one carbon atom and (ii) the chain or ring does not include more than three consecutive continuously chemically bonded carbon atoms, said dissolved component more particularly comprising:
   (A.1) surfactant molecules that constitute at least 0.080% of the total molding facilitator liquid composition, said surfactant molecules including substituted-imidazoline-moiety-containing surfactants; and
   (A.2) to an extent of at least 0.10% of the total molding facilitator liquid composition, molecules selected from a group consisting of (i) homopolymers of ethylene glycol, (ii) monoethers of polymers of ethylene and propylene glycols, and (iii) glycerin and propylene glycol.

11. A liquid composition of matter according to claim 10, wherein there are present distinct masses of each of (i) imidazoline-moiety-containing surfactant molecules, each of which includes a substituted imidazoline moiety in which there is a hydrophobic moiety attached to the carbon atom in the imidazoline moiety that is directly bonded to both nitrogen atoms in the imidazoline moiety and (ii) glycol molecules, and the mass of glycol molecules has a ratio to the mass of imidazoline-moiety-containing surfactant molecules that is from 3.0:1.0 to 20:1.0.

12. A liquid composition of matter according to claim 11, wherein:
   said imidazoline-moiety-containing surfactant molecules also include at least one substituent moiety bonded to a nitrogen atom in the imidazoline moiety, these substituent moieties being selected from the group consisting of (i) hydroxyalkyl moieties, (ii) carboxyalkyl moieties, and (iii) carbonate moieties;
   the ratio of the mass of glycol molecules to the mass of imidazoline-moiety-containing surfactant molecules is from 5.0:1.0 to 16:1.0;
   component (A) constitutes from 4.0 to 40% of the total liquid composition;
   surfactant molecules that are part of component (A) constitute from 0.30 to 15 % of the total liquid composition;
   molecules selected from a group consisting of (i) homopolymers of ethylene glycol, (ii) monoethers of polymers of ethylene and propylene glycols, and (iii) glycerin and propylene glycol constitute at least 2.5% of the total liquid composition;
   molecules selected from a group consisting of (i) homopolymers of ethylene glycol and (ii) monoethers of polymers of ethylene and propylene glycols do not constitute more than 30% of the total composition; and
   the liquid composition has a pH value within a range from 6.0 to 11.0.

13. A liquid composition of matter according to claim 12, wherein:
   said imidazoline-moiety-containing surfactant molecules are selected from a group consisting of (i) alkali metal salts of 3-[1-(2-hydroxyethyl)-2-capryl-3-imidazolinyl] propanoic acid and (ii) substituted imidazoline dicarbonate molecules;

the ratio of the mass of glycol molecules to the mass of imidazoline-moiety-containing surfactant molecules is from 7.5:1.0 to 11.0:1.0;

component (A) constitutes from 8.0 to 31% of the total liquid composition;

surfactant molecules that are part of component (A) constitute from 0.80 to 6% of the total liquid composition;

molecules selected from a group consisting of (i) homopolymers of ethylene glycol, (ii) monoethers of polymers of ethylene and propylene glycols, and (iii) glycerin and propylene glycol constitute at least 5.0% of the total liquid composition;

molecules selected from a group consisting of (i) homopolymers of ethylene glycol and (ii) monoethers of polymers of ethylene and propylene glycols do not constitute more than 10% of the total composition; and the liquid composition has a pH value within a range from 7.6 to 9.9.

14. A liquid composition of matter useful as a molding facilitator in a process according to claim 6, said liquid composition having been made by mixing with a first mass of water a second mass of a water soluble component (A) consisting of organic substances each molecule of which contains at least one continuously chemically bonded chain or ring of atoms in which there are at least two carbon atoms and at least two atoms selected from a group of heteroatoms, said group of heteroatoms consisting of oxygen, nitrogen, sulfur, and phosphorus, said carbon atoms and heteroatoms being arranged in such an order along said continuously chemically bonded chain or ring that (i) each heteroatom is bonded to at least one carbon atom and (ii) the chain or ring does not include more than three consecutive continuously chemically bonded carbon atoms, said second mass constituting at least 0.70% of the total liquid composition and more particularly including:

a third mass of surfactant molecules that constitute at least 0.080% of the total liquid composition, said third mass including substituted-imidazoline-moiety-containing surfactants; and a fourth mass of molecules selected from a group consisting of (i) homopolymers of ethylene glycol, (ii) monoethers of polymers of ethylene and propylene glycols, and (iii) glycerin and propylene glycol, said fourth mass constituting at least 0.10% of the total liquid composition.

15. A liquid composition of matter according to claim 14, wherein said third mass includes a fifth mass of imidazoline-moiety-containing surfactant molecules, each of which includes a substituted imidazoline moiety in which there is a hydrophobic moiety attached to the carbon atom in the imidazoline moiety that is directly bonded to both nitrogen atoms in the imidazoline moiety; said fourth mass includes a sixth mass of glycol molecules; and said sixth mass has a ratio to said fifth mass that is from 3.0:1.0 to 20:1.0.

16. A liquid composition of matter according to claim 15, wherein:

said imidazoline-moiety-containing surfactant molecules also include at least one substituent moiety bonded to a nitrogen atom in the imidazoline moiety, these substituent moieties being selected from the group consisting of (i) hydroxyalkyl moieties, (ii) carboxyalkyl moieties, and (iii) carbonate moieties;

the ratio of said sixth mass to said fifth mass is from 5.0:1.0 to 16:1.0;

said second mass constitutes from 4.0 to 40% of the total liquid composition;

said third mass constitutes from 0.30 to 15% of the total liquid composition;

said fourth mass constitutes at least 2.5% of the total liquid composition;

molecules selected from a group consisting of (i) homopolymers of ethylene glycol and (ii) monoethers of polymers of ethylene and propylene glycols do not constitute more than 30% of the total composition; and the liquid composition has a pH value within-a range from 6.0 to 11.0.

17. A liquid composition of matter according to claim 16, wherein:

said imidazoline-moiety-containing surfactant molecules are selected from a group consisting of (i) alkali metal salts of 3-[1-(2-hydroxyethyl)-2-capryl-3-imidazolinyl] propanoic acid and (ii) substituted imidazoline dicarbonate molecules;

the ratio of said sixth mass to said fifth mass is from 7.5:1.0 to 11.0:1.0;

said second mass constitutes from 8.0 to 31% of the total liquid composition;

said third mass constitutes from 0.80 to 6% of the total liquid composition;

molecules selected from a group consisting of (i) homopolymers of ethylene glycol, (ii) monoethers of polymers of ethylene and propylene glycols, and (iii) glycerin and propylene glycol constitute at least 5.0% of the total liquid composition;

molecules selected from a group consisting of (i) homopolymers of ethylene glycol and (ii) monoethers of polymers of ethylene and propylene glycols do not constitute more than 10% of the total liquid composition; and the liquid composition has a pH value within a range from 7.6 to 9.9.

* * * * *